United States Patent [19]

Schwarz

[11] Patent Number: 4,597,480
[45] Date of Patent: Jul. 1, 1986

[54] POSITIVE ENGAGEMENT TORQUE SENSOR

[75] Inventor: Robert A. Schwarz, Rockford, Ill.

[73] Assignee: Sundstrand Corporation, Rockford, Ill.

[21] Appl. No.: 685,471

[22] Filed: Dec. 24, 1984

[51] Int. Cl.⁴ .............................................. F16D 1/10
[52] U.S. Cl. .................... 192/54; 192/30 W; 192/36; 192/67 P; 74/665 B; 74/665 E; 74/665 GA
[58] Field of Search .................. 192/30 W, 35, 36, 54, 192/56 R, 67 P, 139, 150; 74/665 B, 665 E, 665 GA; 464/33, 37, 38

[56] References Cited

U.S. PATENT DOCUMENTS

| | | | |
|---|---|---|---|
| 2,124,965 | 7/1938 | Lind | 192/150 |
| 2,834,010 | 5/1958 | Sieradzki | 340/268 |
| 2,951,389 | 9/1960 | Wille | 192/54 X |
| 3,132,730 | 5/1964 | Dahlstrand et al. | 192/56 |
| 3,169,178 | 2/1965 | Notchev et al. | 200/61.46 |
| 3,320,772 | 5/1967 | Saxton | 64/30 |
| 3,935,754 | 2/1976 | Comollo | 74/665 F |
| 4,255,946 | 3/1981 | Hansen | 64/29 |
| 4,276,758 | 7/1981 | Coman et al. | 64/9 R |
| 4,340,133 | 7/1982 | Blersch | 192/30 W |

*Primary Examiner*—George H. Krizmanich
*Attorney, Agent, or Firm*—Wood, Dalton, Phillips, Mason & Rowe

[57] ABSTRACT

A redundant drive having primary and secondary load paths may have a torque sensor to indicate a failure of the primary load path and make a drive connection for transmitting torque through the secondary load path.

The positive engagement torque sensor has a pair of adjacent facing plates connected to coaxial shafts of the secondary load path, with one plate having a series of circularly-arrayed pairs of spaced-apart openings and the other plate having a series of circularly-arrayed movable pins engageable with the first plate and movable within a dead zone between openings of a pair of openings. When there is a failure in the primary load path, the movable pins move into the openings to lock the plates together and provide for torque transmission through the secondary load path. Additionally, the movement of the plates into locked relation causes the functioning of a signalling device to signal the failure of the primary load path through signalling elements including a noncontactable sensor in the form of a magnetic pickup unit which has a magnetic field through which a flag tab may pass upon the lock-up of the plates. The flag tab is part of a flag pivotally carried on one of the plates and having a contoured slot engageable by a flag pin on the other plate to control the position of the flag between an inoperative position and a position in which the flag tab coacts with the magnetic pickup unit to generate a failure signal.

22 Claims, 7 Drawing Figures

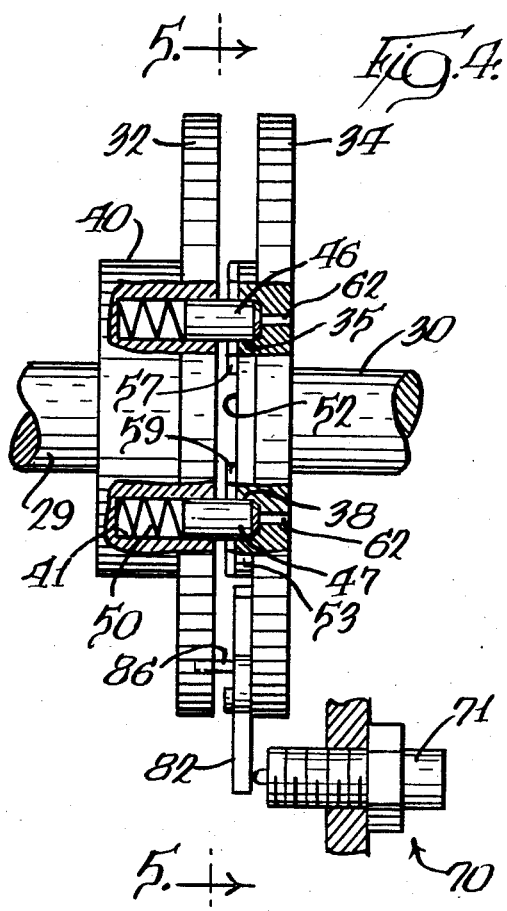
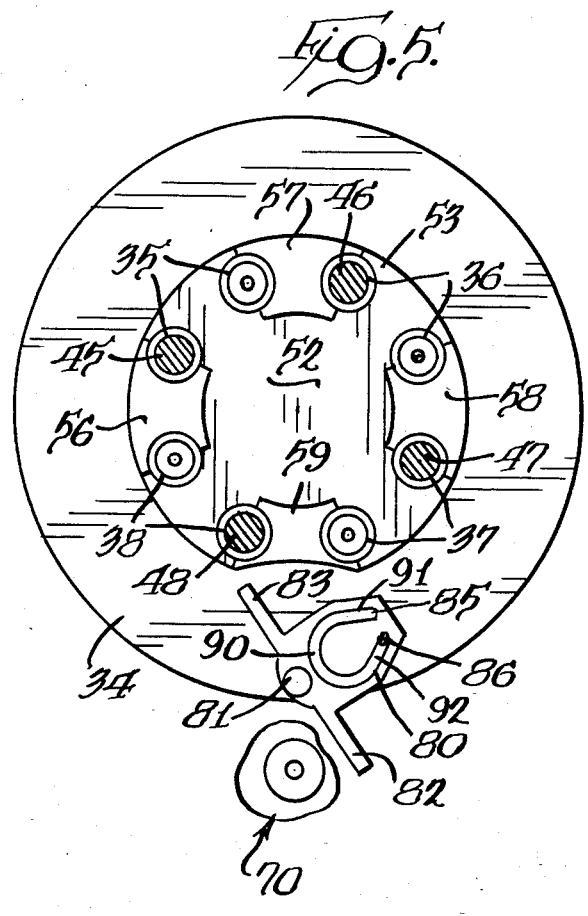
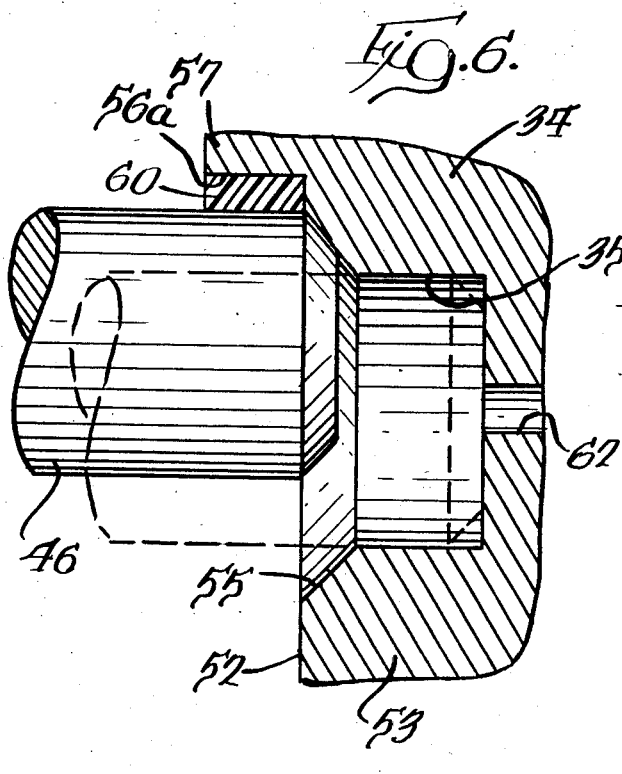
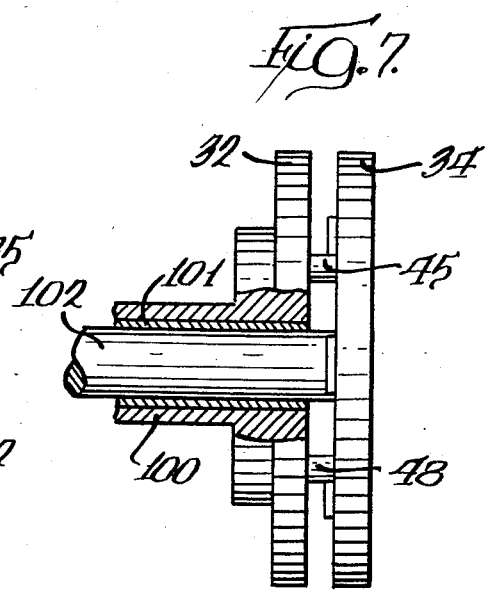

POSITIVE ENGAGEMENT TORQUE SENSOR

DESCRIPTION

1. Technical Field

This invention pertains to a positive engagement torque sensor normally usable in a secondary load path where a primary load path carries all the load until a failure occurs in the primary load path. Once such a failure occurs, the positive engagement torque sensor in the secondary load path becomes operative to transmit the torque and generate a signal to warn of the failure in the primary load path. In certain applications of a torque sensor, there is a requirement that the torque sensor be of a relatively small size, particularly in the axial direction of the torque-transmitting shafts, that there be torque-carrying capability with positive engagement in both directions of rotation of the torque sensor components with minimal free play and that there be means for generating an electrical failure signal not requiring physical contact with the torque sensor. The positive engagement torque sensor disclosed herein meets all of these requirements.

2. Background Art

Because of the safety requirements for aircraft, many aircraft are provided with redundant drive trains wherein a primary drive train or load path normally transmits torque and, upon failure thereof, a secondary drive train or load path becomes operative to transmit torque. An example of such a redundant drive train is in the actuating system for flight control surfaces of an aircraft. In a flap-actuation system, for example, it is essential that the flaps on both wings of an aircraft be symmetrically positioned and with a redundant drive train there is assurance of symmetrical positioning of the flaps through the secondary load path if there should be a failure in the primary load path.

An example of a redundant drive train for an aircraft is shown in the Comollo U.S. Pat. No. 3,935,754 wherein a primary control unit is connected to a primary drive train for operation of a plurality of flap actuators and, when there is a failure in the primary drive train, there is relative movement between drive members of a secondary drive train, with resultant drive coupling therebetween to achieve uniform actuation of the aircraft flaps. The Comollo patent also discloses structure for signalling a failure of the primary drive train by use of one or more mechanically-contacted switches.

An additional patent showing redundant torque-transmitting means with means for detecting and indicating failure of the primary torque-transmitting means is the Coman U.S. Pat. No. 4,276,758.

In the known prior art, as evidenced by the foregoing patents, there is free play in both directions of relative rotation within components of the torque-transmitting structure of the secondary load path, even after failure has occurred and there is physical contact of components in the failure signalling system which can result in degradation due to wear.

The prior art does not disclose a positive engagement torque sensor which provides: positive engagement for torque-carrying capability in both directions of rotation of the torque-transmitting structure after failure has occurred, with the avoidance of free play in both directions of rotation; an electrical failure signal without any physical contact between relatively movable parts which could result in wear; and a compact unit to minimize the space required in the axial direction of the torque-transmitting components.

DISCLOSURE OF THE INVENTION

The positive engagement torque sensor provides for transmission of torque through a secondary load path upon the failure of a primary load path with minimal free play within the torque sensor once the torque sensor locks into drive position. This is achieved by the torque sensor having a pair of members connected one to each of a pair of torque-transmitting shafts or tubes with one of the members having a series of circularly-arrayed openings in the form of holes and the other having a series of circularly-arrayed movable pins urged toward the first member. The movable pins normally engage the first member between openings and can move into the openings to lock the members together upon the occurrence of relative movement between the members resulting from failure of the primary load path.

The positive engagement torque sensor has signalling means for signalling activation of the positive engagement torque sensor upon failure of the primary load path which includes a noncontactable sensor as a detecting unit positioned adjacent the rotatable members as defined in the preceding paragraph and which coacts with a flag having an inactive position and which can be moved to a signalling position upon the occurrence of relative movement between the pair of rotatable members. More particularly, the noncontactable sensor is a magnetic pickup unit and the flag in signalling position has a part thereof caused to move through the magnetic field of the magnetic pickup unit for generating a signal to indicate failure of the primary load path.

A primary feature of the invention is to provide a positive engagement torque sensor which, when activated, provides for a positive engagement between components thereof for torque-carrying capability in both directions of rotation of components of the torque sensor, with minimal free play.

Still another feature of the invention is to provide a positive engagement torque sensor, as defined in the preceding paragraph, wherein the activation of the torque sensor provides for generation of a feedback signal indicating failure of the primary load path. The feedback signal can be delivered to a controller for indicating the failure.

Still another feature of the invention is to provide a positive engagement torque sensor of a compact construction which requires minimal space in the axial direction of the torque-transmitting shafts or tubes associated with the positive engagement torque sensor.

The positive engagement torque sensor has versatility over a wide range of torque, speed and envelope requirements, with the design parameters thereof being variable to handle almost any combination of torque and speed. The positive engagement torque sensor has a pair of spaced-apart facing plates connected one to each of a pair of coaxial shafts, with one plate having a circularly-arrayed plurality of pairs of spaced-apart openings and the other plate having a series of circularly-arrayed outwardly-urged movable pins having normal contact with the first plate between a pair of openings and in a dead zone wherein there is no torque-transmitting capability. Upon the occurrence of a failure in the primary load path, the plates move relative to each other to bring an opening of each of the pairs of openings, dependent upon the direction of relative movement, into alignment with a movable pin whereby the movable pins can move into the openings to achieve a positive drive engagement. The torque-carrying capability is thus dependent upon the number of movable pins, the diameter thereof and the radius of the circle upon which they are circularly arrayed. Increase of any of these parameters increases the torque capacity of the positive engagement torque sensor while correspondingly decreasing these parameters would decrease the torque capacity. The speed capability for achieving engagement is dependent upon the arc length between the openings in the first plate, the shaping of the entry to the openings in the first plate, and the force of springs associated with the movable pins for urging them into the openings. Thus, the positive engagement torque sensor can be designed balancing the requirements of torque and speed for proper operation with size and weight considerations which can be particularly important in an aircraft application.

An object of the invention is to provide a new and improved positive engagement torque sensor which provides positive engagement in both directions of rotation for torque transmission with minimal free play and which provides electrical signalling means not requiring any physical contact between relatively rotatable elements.

Still another object of the invention is to provide a positive engagement torque sensor having a pair of spaced-apart facing members connectable one to each of a pair of shafts, a series of circularly-arrayed openings in one member, a series of circularly-arrayed movable pins on the other member, spring means urging said movable pins toward said one member and into contact therewith adjacent an opening, said movable pins and openings being circularly-arrayed on the same radius whereby relative movement between said members will enable a movable pin to move into an opening.

Still another object of the invention is to provide a positive engagement torque sensor as defined in the preceding paragraph wherein the openings are arranged in spaced pairs and a movable pin is in contact with said one member between the openings of a pair of openings whereby a movable pin can move into an opening in either direction of relative rotation between said members.

Still another object of the invention is to provide a positive engagement torque sensor as defined in the preceding paragraphs wherein there are raised pin stops on said one member associated with the openings to assure engagement of a movable pin in an opening upon the occurrence of relative rotation.

Still another object of the invention is to provide a positive engagement torque sensor having a pair of members rotatable independently of each other, means for interconnecting said members for rotation together upon the occurrence of relative rotation between said members, and signalling means for indicating said interconnection including a movable flag carried by one of said members, means for moving said flag to a signalling position upon said occurrence of relative rotation, and a noncontactable sensor for detecting the flag in said signalling position.

Still another object of the invention is to provide a positive engagement torque sensor having versatility over a wide range of torque, speed and envelope requirements by having readily variable design parameters and which provides positive engagement for torque transmission with generation of an electrical failure signal without any contact between parts to avoid degradation from wear.

BRIEF DESCRIPTION OF THE DRAWINGS

FIG. 4 is a view, similar to FIG. 2, showing components of the torque sensor in positive engagement and signalling means in signalling position;

FIG. 5 is a vertical section, taken generally along the line 5—5 in FIG. 4;

FIG. 6 is a fragmentary view, showing the relation between a movable pin and a pin stop and on an enlarged scale; and FIG. 7 is a fragmentary view, similar to FIG. 2, of an alternate embodiment of the invention.

BEST MODES FOR CARRYING OUT THE INVENTION

Figure 1:
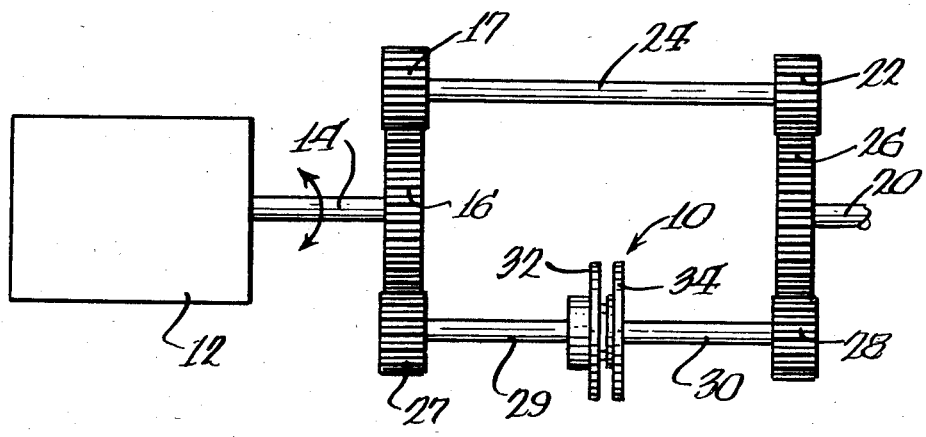
FIG. 1 is a diagrammatic view of a drive train having primary and secondary load paths.

The positive engagement torque sensor is indicated generally at 10 and is shown in FIG. 1 in association with a redundant drive train. A power source 12 drives a shaft 14 having a gear 16 meshing with a gear 17 of a primary load path. An output shaft 20 is driven from the power source 12 through the primary drive train by meshing gears 16 and 17, with the gear 17 driving a gear 22 on a common shaft 24 and with the gear 22 meshing with a gear 26 connected to the output shaft 20. The secondary drive train or load path has a gear 27 meshing with the gear 16 and a gear 28 meshing with the gear 26. The gear 27 is carried on a shaft 29 connected to one side of the positive engagement torque sensor 10 and the gear 28 is connected to a shaft 30 connected to the other side of the positive engagement torque sensor 10.

In normal operation, the power source 12 drives the output shaft 20 through the primary drive train or load path and, upon failure of the drive train, there is relative movement between components of the positive engagement torque sensor to bring the torque sensor into positive engagement whereby the drive of the output shaft 20 is through the secondary load path.

The positive engagement torque sensor has a pair of members connected one to each of the shafts 29 and 30 which, more particularly, are a pair of plates 32 and 34 connected to the shafts 29 and 30, respectively, and which are in spaced-apart facing relation. One of these members, the plate 34, has a series of circularly-arrayed spaced-apart pairs of openings, with these pairs of openings being shown at 35-38. The other member, namely plate 32, has a raised central section 40 and is formed with a circular array of recesses 41, each of which mount a movable pin 45-48. The movable pins are urged outwardly of the recesses 41 by spring means in the form of springs 50 positined one in each recess between the inner end of a movable pin and the base of the recess. The stiffness of the springs 50 must be increased as the designed angular velocity increases.

Figure 3:
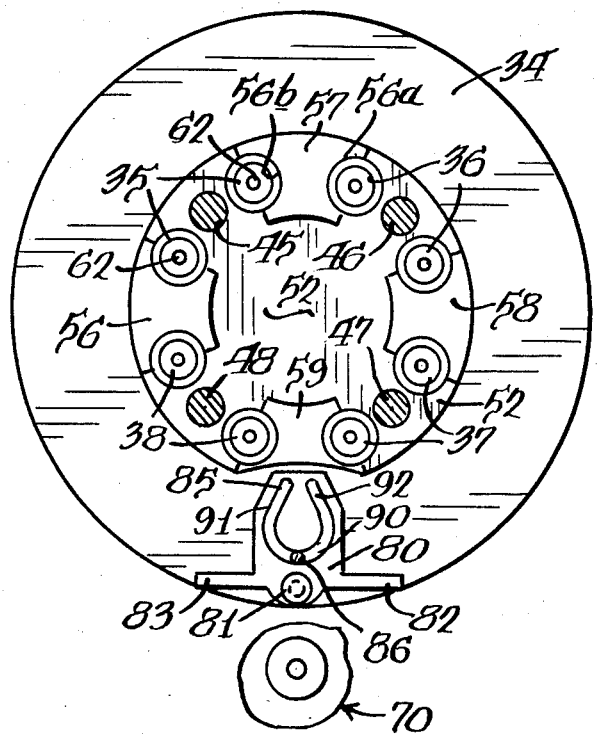
FIG. 3 is a vertical section, taken generally along the line 3—3 in FIG. 2.

When the positive engagement torque sensor is inactive, the movable pins 45-48 are urged outwardly by the springs 50 into engagement with a face 52 of a central raised part 53 of the plate 34. As seen in FIG. 3, the movable pins 45-48 are in engagement with the face 52 and are in a dead zone between the pairs of openings 35–38. When there is a failure of the primary load path, there is relative movement between the plates 32 and 34 to cause relative rotation between the movable pins and the pairs of openings. With counterclockwise relative movement of the plate 32, the torque sensor is brought into positive engagement by the movable pins moving into an opening of each pair, as seen in FIG. 5. An opposite direction of relative rotation would reverse the interengagement of pins and openings from that shown in FIG. 5.

Figure 2:
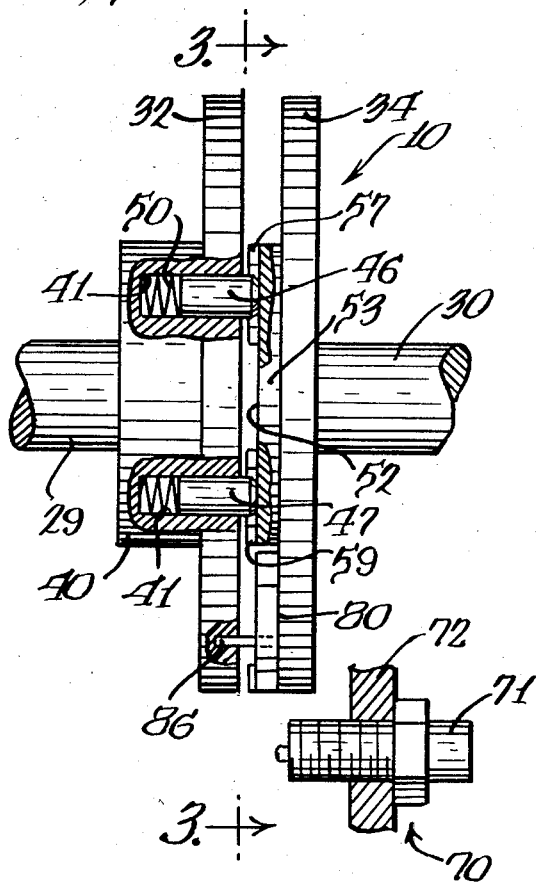
FIG. 2 is a fragmentary elevational view of the positive engagement torque sensor with parts broken away.

For purposes of illustration of the invention, it will be noted that FIGS. 2 and 4 show parts broken away to illustrate positions of two of the movable pins, namely pins 45 and 48, in the inactive position of FIG. 2 and the engaged position of FIG. 4.

The entry of the movable pins 45–48 into an opening of each of the pair of openings 35–38 is facilitated by a chamfer of each of the openings, with an enlarged view of a portion of the plate 34 being shown in FIG. 6 wherein the opening 35 has the chamfer 55. This provides a smooth transition for entry of a movable pin into an opening and enables an increase in angular velocity.

Upon failure of the primary load path, the plates 32 and 34 move relative to one another rotatively whereby the spring-loaded pins 45–48 can move into certain of the openings 35–38 to produce a positive locked connection between the two plates and torque can be applied through the positive engagement torque sensor in both directions of rotation of the secondary load path with minimal free play. The circular array of movable pins and spaced pairs of openings lie on circles having the same radius whereby relative rotation about the axis of the shafts 29 and 30 brings a movable pin into alignment with an opening for movement into the opening. The torque-carrying capability is dependent upon the number of movable pins 45–48, upon the diameter thereof, and the radius of the circle on which they are circularly arrayed. Increasing any of these parameters increases the torque capacity and decreasing the parameters decreases the torque capacity. Speed capability is dependent upon the arc length between a pair of the openings of the pairs of openings 35–38, the chamfer 55 at the openings and the strength of the springs 50.

To assure that the movable pins 45–48 will enter into openings of the pairs of openings, added pin stops are provided. There are a plurality of raised pin stops 56–59 extending above the face 52 and positioned between adjacent openings of two pairs of spaced-apart openings. The pin stops have oppositely-facing, generally semi-circular contours 56a and 56b. In the event the movable pins 45–48 do not move into openings on the first pass over the openings, such as might occur with a large angular velocity, the pin stops 56–59 serve as a safety-catch feature to provide an abutment for the pins which allows torque to be transmitted, even if the movable pins are not in the openings. After the transmitted torque is reduced or the direction of relative rotation between the plates 32 and 34 is reversed, the movable pins will move into the openings. There is a relatively small amount of lost motion if the movable pins should pass the openings and move into engagement with the pin stops and, once the movable pins move into the openings, there is a positive drive with minimal free play in both directions of torque transmission. A layer 60 of resilient material may be associated with each of the curved pin stops to cushion the engagement of a movable pin with the pin stop.

The space between a pair of openings 35–38 against which a movable pin abuts provides a dead zone of an adequate arc length of movement of a movable pin relative to the openings wherein the torque sensor will not go into positive engagement. This is desirable in the event there is free play in the primary load path which could result in some limited amount of relative motion between the plates 32 and 34 of the torque sensor. It is desirable to have the aforementioned dead zone while still limiting the distance that a pin must travel to enter into an opening in order to limit the engagement velocity and increase the probability of proper engagement of a pin in an opening. For this purpose, there are twice as many openings 35–38 as there are movable pins 45–48.

When it is desired to disengage the torque sensor, a simple tool may be used to push the movable pins back out of the openings. For this purpose, each of the openings in the plate 34 has a pin release hole 62 extending from the other face of plate 31 and communicating with the base of the opening. The tool could be a two-part circular disc with a central opening to fit around the shaft 30 and having a series of pins circularly arrayed similarly to the openings 35–38 and equal in number thereto and of a size to move through the openings 62. This would push the movable pins out of the openings 35–38 a sufficient distance whereby the plates 32 and 34 are free for relative rotation and can be relatively rotated to bring the movable pins back into contact with the face of the plate 34 in the aforementioned dead zone.

The positive engagement torque sensor has signalling means for signalling to a controller the positive engagement of the torque sensor and, thus, a failure in the primary load path. This signalling means includes a detecting unit having a noncontactable sensor, indicated generally at 70, and which is in the form of a magnetic pickup unit 71 suitably secured to a mounting plate 72. The magnetic pickup unit is a known type of device having a magnetic field. When there is a change in the magnetic field, an electric signal is produced. The positive engagement torque sensor has a movable flag for changing the magnetic field. The flag is a member having an inoperative position and which is movable to an operative position upon relative movement between the plates 32 and 34 to bring a flag tab into the magnetic field of the magnetic pickup unit. The movement of the flag to active position upon the occurrence of relative movement between the plates is caused by interengagement of a pin on one plate in a slot of the flag, which is pivotally mounted on the other plate.

In the particular embodiment shown, a flag 80 is pivotally mounted to the plate 34 at 81 and has a pair of flag tabs 82 and 83. The body of the flag 80 has a contoured slot 85 which movably receives a flag pin 86 extending outwardly from a face of the plate 32. The contoured slot 85 is generally U-shaped, with an arcuate base section 90 and a pair of symmetrically-arranged legs 91 and 92 extending therefrom. With the torque sensor inactive, the flag pin 86 is within the base section 90 of the contoured slot and with limited free play between the plates, as previously mentioned, the flag pin 86 can move in either direction along the base section, as seen in FIG. 3, without substantial pivoting movement of the flag whereby the flag tabs 82 and 83 remain generally in the position shown in FIG. 3.

When the relative movement between the plates is sufficient to cause the movable pins 45–48 to move into openings 35–38 of the plate 34, the flag pin 86 will have moved into one of the legs 91 or 92 to pivot the flag, whereby one of the flag tabs extends outwardly and passes through the magnetic field of the magnetic pickup unit 70. One of these positions is shown in FIG. 5 wherein the flag pin 86 is at the end of the leg 92 and the flag tab 82 is positioned to move through the magnetic field of the magnetic pickup unit. When the relative rotation of the plates 32 and 34 is reversed from that illustrated in FIG. 5, the flag pin 86 would be at the end of the leg 91 and the flag tab 83 would be in the magnetic field of the magnetic pickup unit.

With the plates locked together through the movable pins 45-48, flag pin 86 holds the flag in pivoted position to assure that a flag tab passes through the magnetic field. The contoured slot 85 is related to the arrangement of movable pins 45-48 and pairs of openings 35-38 to assure adequate pivoting of the flag 80 in response to relative movement between the pins and openings to achieve the positive engagement. The signal delivered by the magnetic pickup unit 70 can be varied, dependent upon the geometry of the flag tabs 82 and 83 as well as the angle at which the tab passes through the magnetic field. Additional variations are achieved by the distance between the tip of the magnetic pickup unit and the flag tab as the flag tab passes in front of the magnetic pickup unit. It will be evident that there is no physical contact between the flag tabs and the magnetic pickup unit whereby there is no degradation due to wear resulting from contact between relatively movable elements.

An alternative embodiment of the invention is shown in FIG. 7 wherein the positive engagement torque sensor has the same construction as that described in the embodiment of FIGS. 1 to 6, but with a difference in the torque flow through the torque sensor. In the embodiment of FIGS. 1-6, the torque flow is from one side of the torque sensor to the other and between shafts 29 and 30. In FIG. 7, the torque flow comes in and goes out of the same side of the torque sensor. This variation is achieved by having the plate 32 fixed to a tubular shaft 100 and mounting a bearing 101 in which a shaft 102 rotates and which is connected to the plate 34. The remainder of the structure of the embodiment of FIG. 7 is the same as that described in the embodiments of FIGS. 1 to 6.

I claim:

1. A positive engagement torque sensor having a pair of members rotatable independently of each other, means operable upon the occurrence of relative rotation between said members for locking said members together for rotation in unison to transmit torque in either forward or reverse directions of rotation with minimal free play, and signalling means for indicating said relative rotation including a movable falt carried by one of said members, means for moving said flag to a signalling position upon said occurrence of relative rotation, and noncontactable sensor for detecting the flag in said signalling position.

2. A positive engagement torque sensor as defined in claim 1 wherein said noncontactable sensor is a magnetic pickup unit.

3. A positive engagement torque sensor as defined in claim 1 wherein said flag is pivotally mounted on one of said members and has a contoured slot therein, and a flag pin fixed to the other of said members and positioned in said contoured slot, said contoured slot permitting limited relative movement between the flag pin and the flag without pivoting of the flag.

4. A positive engagement torque sensor as defined in claim 3 wherein said contoured slot is generally U-shaped having a base section and a pair of legs extending therefrom, said flag pin engaging in said base section when said members are independently rotatable and moving into one of said legs when said relative rotation of the members occurs to pivot the flag to said signalling position.

5. A positive engagement torque sensor as defined in claim 4 wherein said base section is of a length to permit limited movement of the flag pin therealong without pivoting of the flag.

6. A positive engagement torque sensor as defined in claim 1 wherein said pair of members are a pair of plates in facing spaced relation, one of said plates having a series of pairs of openings, and the other plate having a series of movable pins urged toward said one plate and having inactive positions with a movable pin between the openings of a pair of openings.

7. A positive engagement torque sensor as defined in claim 6 including pin stops on said one plate positioned adjacent said openings to be engaged by a movable pin in the event a movable pin does not enter an opening in said one plate upon said occurrence of relative rotation.

8. A positive engagement torque sensor as defined in claim 6 wherein each of said openings open to one face of said one plate and pin release holes communicating one with each of said openings and extending to the other face of said one plate.

9. A positive engagement torque sensor connected in a secondary load path for transmission of torque upon failure of a primary load path comprising, a pair of coaxial shafts, a pair of plates in spaced facing relation and mounted one to each of said shafts, a plurality of pairs of spaced-apart openings in one of said plates disposed in a circular array with a space between each pair, a plurality of raised pin stops extending from a face of said one plate and positioned between openings of adjacent pairs of said spaced-apart openings, a plurality of circularly-arrayed movable pins projecting outwardly from a face of the other plate, spring means associated with the movable pins urging the movable pins into contact with said face of said one plate between the openings of a pair thereof, a magnetic pickup unit positioned adjacent the periphery of said plates, a flag for signalling relative movement between said plates and having a pair of tabs one of which can be moved to a signalling position in the field of the magnetic pickup unit, means pivotally mounting the flag to one or the other of the plates, a generally U-shaped slot in said flag providing the slot with a base section and a pair of symmetrical legs, and a flag pin extending from the plate which does not pivotally mount the flag and positioned in the slot, whereby a predetermined amount of relative rotational movement between said plates will cause the movable pins to enter openings in the one plate and the flag pin will pivot the flag to signalling position.

10. A positive engagement torque sensor as defined in claim 9 wherein there are twice as many of said openings as there are movable pins.

11. A positive engagement torque sensor as defined in claim 9 wherein the diameter of a movable pin is less than the space between a pair of said spaced-apart openings.

12. A positive engagement torque sensor as defined in claim 9 wherein said flag tabs are positioned in the space between said plates when the flag pin is in the base section of said slot.

13. A positive engagement torque sensor as defined in claim 9 wherein each of said openings has a chamfer at an end thereof to facilitate entry of a movable pin into an opening.

14. A positive engagement torque sensor as defined in claim 9 wherein said spring means associated with the movable springs comprises a plurality of springs associated one with each movable pin.

15. A positive engagement torque sensor as defined in claim 9 including pin release holes associated with said openings to enable pushing said movable pins out of said openings.

16. A positive engagement torque sensor comprising a pair of spaced-apart facing members connectable one to each of a pair of shafts, a series of circularly-arrayed openings in one member, a series of circularly-arrayed movable pins on the other member, spring means urging said movable pins toward said one member and into contact therewith adjacent an opening, said movable pins and openings being circularly-arrayed on the same radius whereby relative movement between said members will enable a movable pin to move into an opening.

17. A positive engagement torque sensor as defined in claim 16 wherein said openings are in spaced pairs and a movable pin is in contact with said one member between the openings of a pair of openings.

18. A positive engagement torque sensor as defined in claim 17 including a raised pin stop between two openings of adjacent pairs of openings.

19. A positive engagement torque sensor as defined in claim 16 including a raised pin stop adjacent an opening.

20. A positive engagement torque sensor for selective transmission of torque comprising, a pair of coaxial shafts, first and second plates in spaced facing relation and mounted one to each of said shafts, a plurality of pairs of spaced-apart openings in said first plate disposed in a circular array with a space between each pair, a plurality of circularly-arrayed movable pins projecting outwardly from a face of the second plate, spring means associated with the movable pins urging the movable pins into contact with a face of the first plate between the openings of a pair thereof, a detecting unit positioned adjacent the periphery of said plates, a flag for signalling relative movement between said plates and having a pair of tabs one of which can be moved to a signalling position relative to the detecting unit, means pivotally mounting the flag to one of said plates, a generally U-shaped slot in said flag providing the slot with a base section and a pair of symmetrical legs, and a flag pin extending from the other of said plates and positioned in the slot, whereby a predetermined amount of relative rotational movement between said plates will cause the movable pins to enter openings in the first plate and the flag pin will pivot the flag tab to signalling position.

21. A positive engagement torque sensor for selective transmission of torque upon failure of a primary load path comprising, a pair of coaxial shafts, first and second plates in spaced facing relation and mounted one to each of said shafts, a plurality of openings in the first plate disposed in a circular array with a space between each opening, a plurality of circularly-arrayed movable pins projecting outwardly from a face of the second plate, spring means associated with the movable pins urging the movable pins into contact with a face of the first plate adjacent said openings, a magnetic pickup unit positioned adjacent the periphery of said plates, a flag for signalling relative movement between said plates and which can be moved to a signalling position in the field of the magnetic pickup unit, means pivotally mounting the flag to one of said plates, a slot in said flag, and a flag pin extending from the other of said plates and positioned in the slot, whereby a predetermined amount of relative rotational movement between said plates will cause the movable pins to enter openings in the first plate and the flag pin will pivot the flag to signalling position.

22. A positive engagement torque sensor as defined in claim 7 wherein each of said pin stops has a layer of resilient material thereon to cushion the engagement of a movable pin with a pin stop.

* * * * *